(12) United States Patent
Zimmer et al.

(10) Patent No.: US 7,761,701 B2
(45) Date of Patent: Jul. 20, 2010

(54) COMPONENT FIRMWARE INTEGRATION IN DISTRIBUTED SYSTEMS

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 677 days.

(21) Appl. No.: 11/728,385

(22) Filed: Mar. 26, 2007

(65) Prior Publication Data
US 2008/0244259 A1 Oct. 2, 2008

(51) Int. Cl.
*G06F 9/445* (2006.01)
(52) U.S. Cl. .............................. 713/100; 713/1; 713/2

(58) Field of Classification Search ................ 713/100, 713/1, 2
See application file for complete search history.

(56) References Cited

U.S. PATENT DOCUMENTS 7,185,190 B2 * 2/2007 Rothman et al. ............... 713/2
7,552,244 B2 * 6/2009 Maciesowicz ................. 710/9

* cited by examiner

*Primary Examiner*—Nitin C Patel
(74) *Attorney, Agent, or Firm*—Trop, Pruner & Hu, P.C.

(57) ABSTRACT

A plurality of platforms may be defined in a distributed system. Each of the platforms may include a processor and a chipset from a common source on a single motherboard. Extensible firmware interface drivers are provided for the processors and the chipsets. Each of the platforms may be defined pursuant to a system definition model where the system definition model defines the firmware for each of the platforms. As a result, any of the platforms can be updateable from a common source, such as an Internet web site.

11 Claims, 1 Drawing Sheet

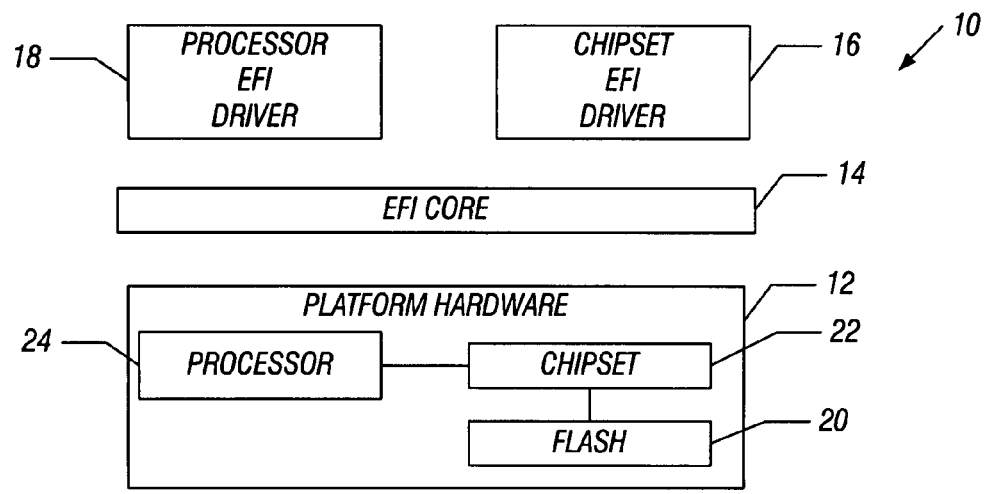
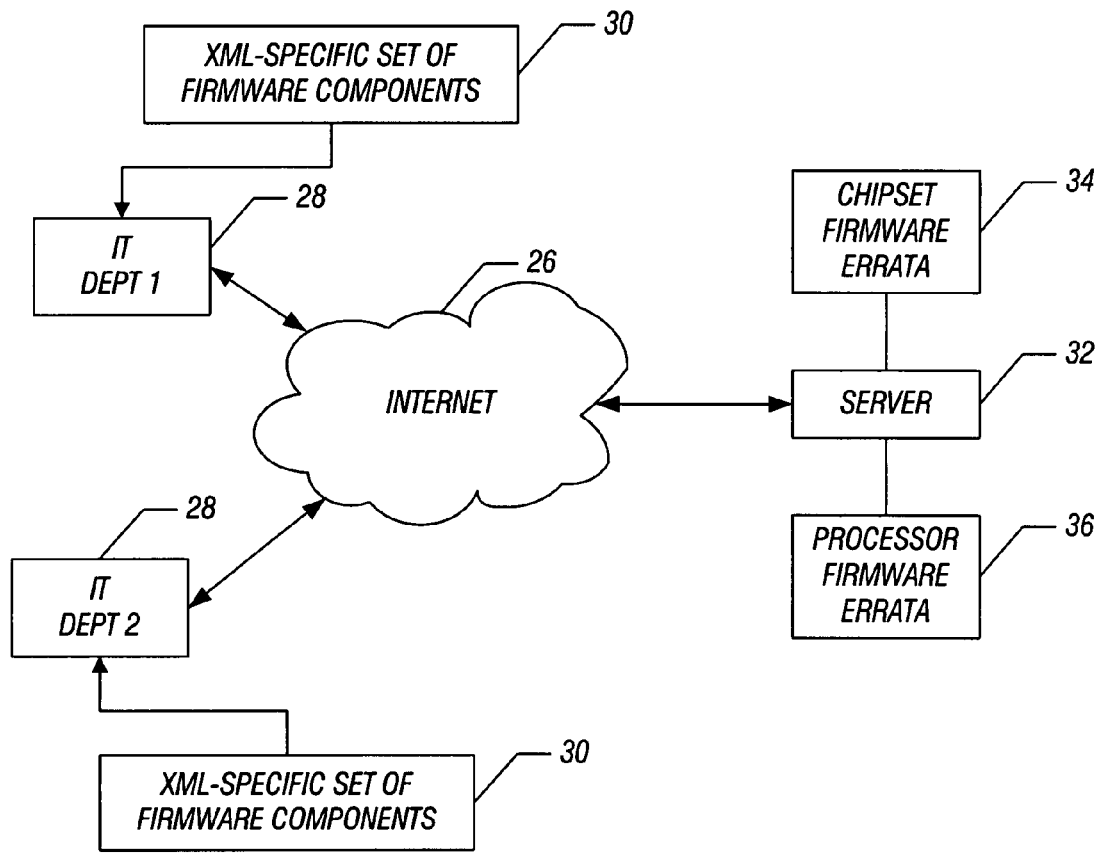

COMPONENT FIRMWARE INTEGRATION IN DISTRIBUTED SYSTEMS

BACKGROUND

This relates generally to computer systems and, particularly, to firmware used in connection with booting computer systems.

A computer system may boot using firmware including a basic input/output system stored on a memory such as a flash memory. The pre-boot environment is characterized by initiating power to a given platform, and fetching a set of code from the platform firmware to commence boot in the processor.

For an extensible firmware interface (EFI) compliant system, there is firmware in a flash memory that executes and germinates an EFI operational environment. EFI is characterized by a set of boot services, including memory allocation, time, stall, and setting time. In addition, EFI is characterized by a set of protocols that are installable interfaces identified by globally unique identifiers. The various protocol capabilities or services can be published for global use. For example, if the computing device has the universal serial bus, there is a protocol for that bus that a driver publishes. EFI includes a class of images or executables called EFI drivers. An EFI driver is a portable executable, common object file format image. The EFI 1.1 Specification may be obtained from Intel Corporation, Santa Clara, Calif.

BRIEF DESCRIPTION OF THE DRAWINGS

FIG. 1 is a hardware and software depiction of a platform in accordance with one embodiment of the present invention; and FIG. 2 is a depiction of a system for providing firmware updates.

DETAILED DESCRIPTION

In accordance with some embodiments, a universal, global model may be provided for firmware. Thus, different computer systems that comply with the global model may be updated, regardless of the computer manufacturer and regardless of the firmware developer. In effect then, the flash memory that stores the firmware can be implemented as part of a dynamic system initiative (DSI). See Dynamic Systems 2007: Get Started With Dynamic Systems Technology Today, available from Microsoft Corp., Redmond, Wash.

The dynamic system initiative describes the model of XML based components, from the server to the router to the application stack. The synthesis of these components is encapsulated in extensible mark-up language (XML) documents, including the core system definition model (SDM) schema. SDM is a model that is used to create definitions of distributed systems. A distributed system is any set of related software and hardware resources working together to accomplish a common function. Multitier line of business applications, Web services, e-commerce sites, and enterprise data centers are examples of such systems. Using SDM, one can create a blueprint of an entire enterprise. This blueprint can be created and manipulated with software tools. It may also be used to define system elements and capture data pertinent to development, deployment, and operations so that the data becomes relevant across the entire information technology life cycle.

SDM captures, in a self-contained model, all the invariant aspects of a system, including the desired configuration policies and behaviors. It also enables functional decomposition of systems through configurations and classes.

Referring to FIG. 1, a platform 10 may any type of computer system. It may include platform hardware which may assume any possible computer architecture. The hardware 12 may include a processor 24 coupled to a chipset 22, in turn, coupled to a flash memory 20 in one embodiment. The processor, chipset, and flash memory may be combined on a single motherboard. The platform hardware works with an EFI core 14. The EFI core, in turn, communicates with an EFI driver 16 for the chipset 22 and an EFI driver 18 for the processor 18. Similar drivers may be provided for many other hardware components.

By conforming EFI drivers stored on the flash memory 20 to the SDM system, firmware from various platform manufacturers and firmware developers may be more portable across many different hardware platforms. Thus, if various computer manufacturers provide SDM compliant firmware using the EFI framework, updates and bug fixes may be relatively easily implemented. Because the firmware follows a common format defined and published to all through SDM and DSI, fixes may be made generally available as well. As a result, updates and corrections may be relatively easily distributed across different platform types from different platform manufacturers. This is particularly valuable for enterprises or data centers that may have a variety of ad hoc collections of platforms. Each platform currently may have different firmware and, in each case, firmware corrections must be obtained from various sources. If all the platforms were compliant with the SDM model using EFI as described herein, any platform could be updated or repaired using a common operation.

In some cases, systems that are not EFI compliant can even be converted into EFI compatible systems with EFI compatible drivers. Existing drivers can be transformed into EFI compatible pre-boot drivers by encapsulating the operating system vendor's driver. Service calls for input and output of these drivers are mapped to the EFI core 14. A block input/output protocol may still be published as an external, callable interface. The file system driver recognizes a request for a block input/output, but how the actual input/output operations are sequences or in concert with a wrapper driver that encapsulates the operating system driver and makes it compatible with the EFI system.

Because EFI enables firmware in the form of firmware modules and drivers to be loaded from a variety of different resources, including primary and secondary flash devices, option ROMs, various persistent storage devices, and even computer networks, a range of applications may be possible. EFI framework provides processor independent intermediate language known as EFI byte code or EBC. Drivers and modules written in EBC are interpreted at execution time by an appropriate interpreter for the platform. This enables a common set of EBC to support different platform architectures. Modules and components may be written in type-safe, intermediate language called the common language infrastructure to be deployed across execution environments, including pre-boot and operation system runtime environments. In one embodiment, the common language infrastructure is implemented in connection with an EFI based architecture, in combination with runtime programmatic infrastructure.

Normally, EFI drivers are written in C language and then compiled into a .EFI executable. Since C is not completely a type-safe language, the compiled .EFI executable is, likewise, non-type-safe. For example, C allows direct manipulation of values and memory using pointer indirection. This may be addressed, in some embodiments, through the use of a type-safe, intermediate language in corresponding execution infrastructure, in combination with a modified EFI-based loading scheme. In one embodiment, the intermediate language is written to run on the common language infrastructure which has been standardized by an ECMA-335 Specification (European Computer Manufacturers Association, Geneva, Switzerland, 4$^{th}$ Edition, June 2006) and is part of Microsoft.net initiative to support CPU neutral encodings.

An important part of the common language infrastructure is that the intermediate language encoding lends itself to both build and runtime verification. Such verification includes, but is not limited to, memory safety and strong type safety guarantees. As such, the combination of C/C++ compilers that emit intermediate language with the large body of existing EFI driver C code enables basic input/output systems and platform venders to more easily implement firmware solutions that employ type-safe .EFI files.

Referring to FIG. 2, in accordance with one embodiment of the present invention, an Information Technology department 28 may have an XML specific set of firmware components 30 that are applicable across a variety of platforms resident in a given data center or enterprise, for example. In order to obtain updates of those components which may be applicable to any platform within the Information Technology department's purview, the Information Technology department 28 may simply access, through the Internet 26, the server 32. That server 32 may include chipset firmware or errata 34 and processor firmware errata 36. If the platforms are part of the SDM and DSI initiatives, and if EFI is utilized, drivers for firmware may be obtained over the Internet, for example, from a common source. These drivers may then be applied to update drivers on any platform within a large enterprise such as a data center.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   using a system definition model to define firmware for a plurality of platforms in a distributed system;
   providing extensible firmware interface drivers for processors and chipsets on said platforms; and
   accessing, from a common source, errata applicable to different types of platforms.

2. The method of claim 1 wherein accessing involves accessing a web site over the Internet to obtain firmware updates for said platforms.

3. The method of claim 1 including defining said platforms according to the dynamic system initiative.

4. The method of claim 1 including using extensible markup language for said system definition model.

5. The method of claim 1 including providing said processor and chipset on a single motherboard.

6. The method of claim 1 including providing a separate extensible firmware interface driver for said processor and chipset firmware for each platform.

7. A distributed system comprising:
   a plurality of platforms each including a processor and a chipset;
   extensible firmware interface drivers for each of said processors and chipsets; and
   each of said platforms defined, pursuant to a system definition model, said system definition model defining the firmware for each of said platforms.

8. The system of claim 7 wherein said platforms include firmware supplied from different sources that is updateable from a common source.

9. The system of claim 7 wherein said platforms are defined according to the dynamic system initiative.

10. The system of claim 7 wherein said chipset and processor in each platform is formed on a single motherboard.

11. The system of claim 7 including a separate extensible firmware interface driver for the processor and chipset firmware for each platform.

* * * * *